United States Patent [19]

Heiderpriem

[11] 4,065,581

[45] Dec. 27, 1977

[54] BUNS WHICH HAVE CENTRALLY-LOCATED RECESSES

[76] Inventor: Theodore B. Heiderpriem, 4225 1/2 Ravenwood, Pine Lawn, Mo. 63121

[21] Appl. No.: 596,841

[22] Filed: July 17, 1975

Related U.S. Application Data

[60] Continuation of Ser. No. 411,098, Oct. 30, 1973, abandoned, which is a division of Ser. No. 276,746, July 1, 1972, abandoned.

[51] Int. Cl.² .................... A21D 8/06; A21D 13/00
[52] U.S. Cl. ................................. 426/138; 426/514
[58] Field of Search ............... 426/283, 134, 514, 138

[56] References Cited

U.S. PATENT DOCUMENTS

| | | | |
|---|---|---|---|
| 3,290,154 | 12/1966 | Turner | 426/139 X |
| 3,385,205 | 5/1968 | McCloud | 426/138 X |
| 3,410,691 | 11/1968 | Stanley | 426/94 |
| 3,518,091 | 6/1970 | Turner | 426/420 |
| 3,908,022 | 9/1975 | Selleck | 426/138 |

FOREIGN PATENT DOCUMENTS 600,072  6/1960  Canada ........................... 426/138

*Primary Examiner*—Jeanette M. Hunter
*Attorney, Agent, or Firm*—E. Barron Batchelder

[57] ABSTRACT

A mold has a support of heat-resistant material, a surface which is displaced in the upward direction from that support, a recess of semicircular cross section which is displaced in the downward direction from that support and which extends around and extends laterally outwardly relative to that surface, and an inclined wall which extends upwardly from the inner periphery of that recess to the periphery of that surface. Yeast-raised dough can be placed so the center thereof rests on that surface, so the edge thereof extends into that recess, and so the intermediate portions thereof are supported by the inclined wall; and that dough will "proof" on the mold, and can then be baked to form a bun which has a centrally located recess defined by an upwardly and outwardly inclined wall with gently rounded upper edge.

6 Claims, 5 Drawing Figures

U.S. Patent  Dec. 27, 1977  4,065,581
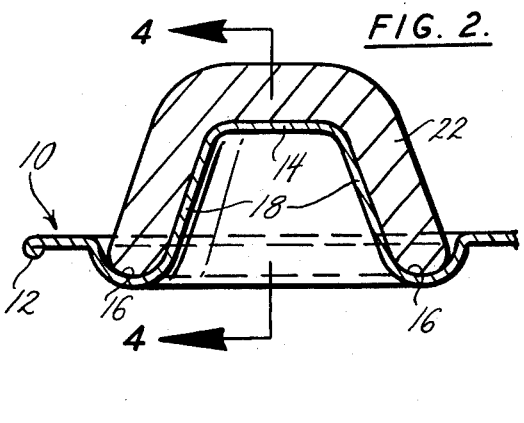
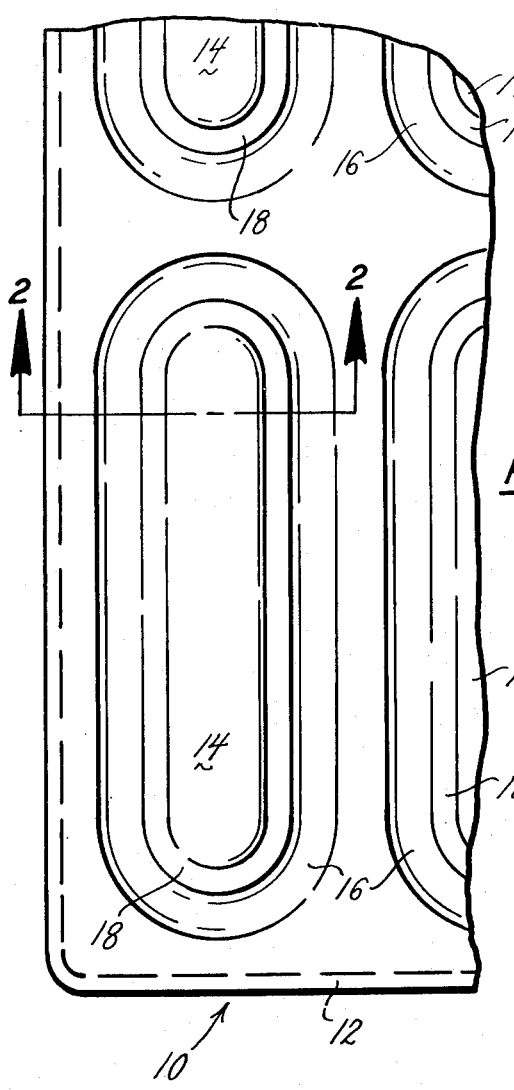
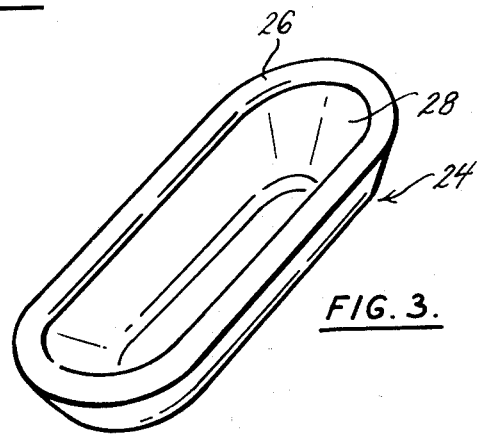
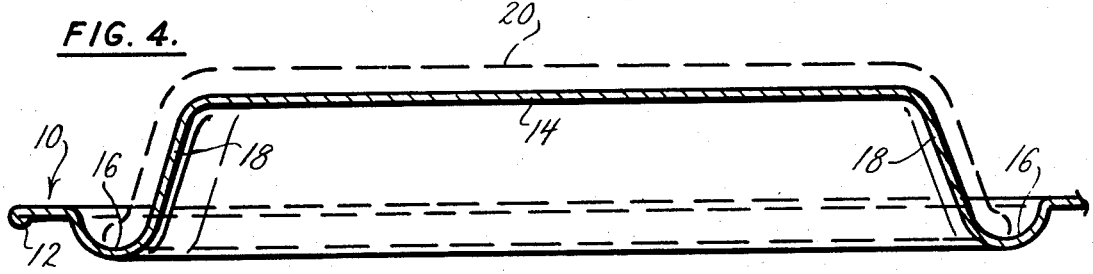
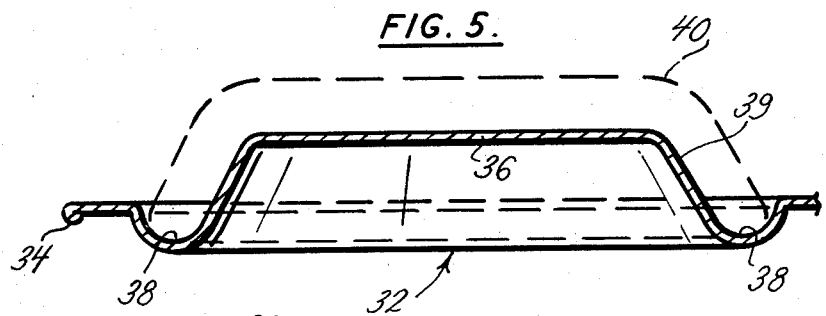

BUNS WHICH HAVE CENTRALLY-LOCATED RECESSES

This is a continuation of application Ser. No. 411,098, filed Oct. 30, 1973, now abandoned which is a division of 276,746, filed July 31, 1972, now abandoned.

This invention related to improvemnts in molds for buns. More particularly, this invention relates to improvements in molds which can be used to form buns that have centrally located recesses therein.

It is, therefore, an object of the present invention to provide a mold which can be used to form buns that have centrally located recesses therein.

The present invention provides a mold which can be used to form a bun that has a deep, centrally located recess therein which is defined by a continuous absorbent wall, so that bun will be able to confine semi-liquid as well as solid edibles. Such a bun is very useful and desirable in holding a frankfurter on which chili, semi-liquid sauces, or "runny" condiments have been placed. The continuous wall, which defines the deep, centrally located recess will hold the chili, sauce or condiments in immediate proximity to the frankfurter, and also will keep that chili, sauce or condiments from dripping onto the ground. In addition, that continuous wall is sufficiently absorbent to absorb and hold enough of the moisture from the chili, sauce or condiments to enable one end of the bun to be progressively eaten away, as one end of the frankfurter is progressively eaten away, without permitting that chili, sauce or condiments to drip onto the ground. It is, therefore, an object of the present invention to provide a bun which has a deep, centrally located recess therein defined by a continuous absorbent wall.

The centrally recessed bun provided by the present invention is formed on a mold which has a support of heat-resistant material, a surface which is displaced in the upward direction from that support, a recess of semi-circular cross section which is displaced in the downward direction from that support and which extends around and extends laterally outwardly relative to that surface, and an inclined wall which extends upwardly from the inner periphery of that recess to the periphery of that surface.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

BRIEF DESCRIPTION OF THE DRAWING

FIG. 1 is a plan view of a portion of one preferred embodiment of mold that is made in accordance with the principles and teachings of the present invention.

FIG. 2 is a sectional view, on a larger scale, through a portion of the mold shown in FIG. 1, and it is taken along the plane indicated by the line 2—2 in FIG. 1, FIG. 3 is a perspective view, on a scale smaller than that of FIG. 1, of a bun which can be made from the mold of FIG. 1, FIG. 4 is a section view, on the scale of FIG. 2, of a portion of the mold shown in FIG. 1, and it is taken along the plane indicated by the line 4—4 in FIG. 2, and FIG. 5 is a sectional view, on the scale of FIG. 2, through a mold which is generally similar to the mold of FIG. 1 but which produces a circular bun rather than an elongated bun.

DESCRIPTION OF THE PREFERRED EMBODIMENTS

Referring to FIGS. 1–4, the numeral 10 generally denotes one preferred embodiment of mold that is made in accordance with the principles and teachings of the present invention. That mold is made from metal which is resistant to heat and to corrosion; and that mold can be made from stiff foil, can be made from a sheet of metal as a stamping, or can be made as a casting. The mold 10 is shown as a planar support which has a stiffened edge 12 that extends around the periphery thereof. If the mold 10 is made from a sufficiently thick and stiff sheet of metal, or if it is made as a casting, the stiffened edge 12 of the planar support of that mold could be omitted.

The numeral 14 denotes an elongated, flat surface which has parallel sides and rounded ends, and that surface is displaced upwardly above the level of the planar support of the mold 10. The numeral 16 denotes a recess which extends downwardly below the level of the planar support of the mold 10; and that recess is semi-circular in cross section. As indicated particularly by FIG. 1, the recess 16 is continuous and it defines two elongated straight sides, and the ends of those sides are joined by semi-circular portions. As a result, the recess 16 extends around and encloses the surface 14; and that recess also extends laterally outwardly relative to that surface. The outer periphery of the recess 16 merges smoothly into the planar support of the mold 10. A continuous wall 18 inclines upwardly from the inner periphery of the recess 16 to the periphery of the surface 14; and that wall interconnects that recess and that surface. The wall 18 merges into the surface 14 by means of a smoothly rounded joint; and that wall merges into the inner periphery of the recess 16 in a smooth and uninterrupted manner.

The mold 10 is shown as being provided with a number of surfaces 14, a number of recesses 16, and a number of inclined walls 18; and any desired numbers of those surfaces, recesses and walls can be provided for that mold. The greater the number of surfaces 14, recesses 16 and inclined walls 18, the thicker and stiffer the mold should be to enable that mold to have the required strength and sturdiness for repeated usage.

The mold 10 will be formed so the exposed area of the recess 16, the exposed area of the inclined wall 18 and the exposed area of the surface 14 will be very smooth and will readily release any dough which has been baked while in engagement with them. That mold also will be formed so it is free of any dihedral angles which could tend to cause baked dough to resist reasonable efforts to free it from that mold.

The numeral 20 in FIG. 4 denotes a layer of yeast-raised dough after that layer has been rolled flat, has been cut so it has a generally oblong configuration, and has been laid on the mold 10 with the central portion thereof resting nicely on the exposed area of the surface 14 and with the edge thereof resting nicely within the recess 16 and with the intermediate portions thereof resting nicely against the exposed area of the inclined wall 18. Because the exposed area of the surface 14, of the recess 16 and of the inclined wall 18 do not subtend any abrupt dihedral angles, the layer 20 of yeast-raised dough can be laid on those areas without tending to tear that layer or to cause that layer to have any excessively thick portions. The numeral 22 in FIG. 2 denotes the layer 20 of yeast-raised dough after that layer has been given time to "proof" itself; and, in its "proofed" state, the layer 22 is thicker, and the edge thereof largely fills the recess 16 and assumes the semicircular cross section of that recess. The "proofed" layer 22 of yeast-raised dough will receive full support from the surface 14, from recess 16, and from inclined wall 18 — during and subsequent to the "proofing" thereof.

The numeral 24 in FIG. 3 generally denotes a bun which was baked while resting on the mold 10 and which was subsequently freed from that mold and inverted. That bun has a smoothly rounded upper edge 26 of semi-circular cross section, has a continuous upwardly and outwardly inclined wall, and has an essentially flat bottom which coacts with that wall to define an elongated, deep, centrally located recess 28. That recess is long enough to accommodate frankfurters of commercially available length; and that recess is wide enough and deep enough to hold appreciable quantities of chili, sauce or condiments in engagement with that frankfurter.

The mold 10 permits the bun 24 to be "proofed" and then baked without any need of a female-type mold, and thus avoids the sticking which frequently is experienced when a female-type mold is used with a male-type mold in the baking of dough. Consequently, that bun can easily and quickly be separated from the mold 10 without any part of that bun being broken or torn — merely by inverting that mold and striking one edge thereof. Further, because the outer areas of the bottom and of the wall of the bun 24 will be exposed to air during the "proofing" and baking of that bun, those areas will have a desirably uniform color, and, more importantly, will have a low degree of porosity. In contrast, the inner surfaces of the bottom and of the wall of the bun 24, and the convex upper edge of that bun, will "proof" and will be baked while in contact with the metal surfaces of the mold 10; and hence those inner surfaces and that upper edge will have a higher degree of porosity. That higher degree of porosity will be desirable because it will enable the bun 24 to absorb enough of the moisture from the chili, the sauce or condiments on the frankfurter to enable the consumer to eat away one end of that bun without permitting the chili, sauce or condiments to run out. Further, the high degree of porosity of the convex upper edge of the bun 24 is desirable; because it will enable that convex upper edge to absorb moisture from any chili, sauce or condiments which may be spilled onto that convex upper edge as the consumer or server applies chili, sauce or condiments to the frankfurter within the recess 28. In absorbing that moisture, that convex upper edge will tend to keep that chili, sauce or condiments from falling onto the ground. The convex nature of the upper edge of the bun 24 is desirable because it enables at least one-half of that upper edge to act in funnel-like fashion to guide any chili, sauce of condiments applied thereto into the recess 28 within that bun. Further, the convex nature of the upper edge of the bun 24 is desirable because it will keep that upper edge from irritating or chafing even the tenderest of lips and mouths.

In the preferred embodiment shonw by FIGS. 1, 2 and 4, the surface 14 is displaced approximately thirteen-sixteenths of an inch above the level of the planar support of the mold 10, and the lowermost portion of the recess 16 is displaced approximately one-quarter of an inch below the level of that planar support. Further, the maximum longitudinal dimension of the surface 14 is approximately 5½ inches, the width of that surface is approximately 1 inch, the inner periphery of the recess 16 is displaced laterally outwardly of the periphery of the surface 14 by approximately one quarter of an inch, and the width of that recess is approximately one-half of an inch. However, if desired, any or all of those dimensions can be varied to correspond to the dimensions of frankfurters of different size.

Referring particularly to FIG. 5, the numeral 32 generally denotes a mold which can be used in the forming and baking of a centrally recessed bun for hamburgers. That mold is made from metal which is resistant to heat and to corrosion; and that mold can be made from stiff foil, can be made from a sheet of metal as a stamping, or can be made as a casting. The mold 32 is shown as a planar support which has a stiffened edge 34 that extends around the periphery thereof. If the mold 32 is made from a sufficiently thick and stiff sheet of metal, or if it is made as a casting, the stiffened edge 34 of the planar support of that mold could be omitted.

The numeral 36 denotes a surface which is displaced upwardly above the level of the planar support of the mold 32; and that surface will be circular in plan to correspond to the circular configuration of a hamburger. The numeral 38 denotes a recess which depends downwardly below the level of the planar support of the mold 32; and that recess is semi-circular in cross section. The recess 38 is continuous, it is concentric with the surface 36, it extends laterally outwardly relative to that surface, and it completely surrounds that surface. A continuous wall 39 inclines upwardly from the inner periphery of the recess 38 to the periphery of the surface 36; and that wall interconnects that recess and that surface. The wall 39, which is frusto-conical in configuration, merges into the surface 36 by means of a smoothly rounded joint; and that wall merges into the inner periphery of the recess 38 in a smooth and uninterrupted manner.

The mold 32 differs primarily from the mold 10 of FIGS. 1, 2 and 4 in that the surface 36 of the mold 32 is circular in plan whereas the surface 14 of the mold 10 is elongated in plan, and in that the recess 38 of the mold 32 is circular in plan whereas the recess 16 of the mold 10 has elongated parallel sides. The mold 32 will be provided with a number of surfaces 36, a number of recesses 38, and a number of inclined walls 39, not shown. The numeral 40 denotes a layer of yeast-raised dough which has been laid on the mold 32 and then permitted to "proof". Initially, that layer had a cross section which was generally comparable to that of the layer 20 shown in FIG. 4; and, at that time, the layer 40 was thinner than shown by FIG. 5, and its edge only partially filled the recess 38. As it "proofed", the layer 40 assumed the configuration shown by FIG. 5, and hence it developed a cross section which is similar to that of the layer 22 in FIG. 2.

The mold 32 permits the layer 40, and the resulting bun, to be "proofed" and then baked without any need of a female-type mold, and thus avoids the sticking which frequently is experienced when a female-type mold is used with a male-type mold in baking dough. Consequently, that bun can easily and quickly be separated from the mold 32 without any part of that bun being broken or torn — merely by inverting that mold and striking one edge thereof. Further, because the outer areas of the bottom and of the wall of the resulting bun will be exposed to air during the "proofing" and the baking of that bun, those areas will have a desirably uniform color and, more importantly, will have a low degree of porosity. In contrast, the inner surfaces of the resulting bun, and the convex upper edge of that bun, will "proof" and will be baked while in contact with the metal surfaces of the mold 32; and hence those inner surfaces and that upper edge will have a higher degree of porosity. That higher degree of porosity will be desirable because it will enable the resulting bun to absorb enough of the moisture from the chili, the sauce or condiments on the hamburger to enable the consumer to eat away one side of that resulting bun without permitting the chili, sauce, or condiments to run out. Further, the high degree of porosity of the convex upper edge of the resulting bun is desirable; because it will enable that convex upper edge to absorb moisture from any chili, sauce or condiments which may be spilled onto that convex upper edge as the consumer or server applies chili, sauce or condiments to the hamburger within the centrally located recess in that resulting bun. In absorbing that moisture, that convex upper edge will tend to keep that chili, sauce or condiments from falling onto the ground. The convex nature of the upper edge of the bun is desirable because it enables at least one-half of that upper edge to act in funnel-like fashion to guide any chili, sauce or condiments applied thereto into the centrally located recess within the resulting bun. Further, the convex nature of the upper edge of that bun is desirable because it will keep that upper edge from irritating or chafing even the tenderest of lips and mouths.

In the preferred embodiment shown by FIG. 5, the surface 36 is displaced approximately three-eights of an inch above the level of the planar support of the mold 32, and the lowermost portion of the recess 38 is displaced approximately one-quarter of an inch below the level of that planar support. Further, the diameter of the surface 36 is approximately 3 inches, the inner periphery of the recess 38 is displaced laterally outwardly of the periphery of the surface 36 by approximately one quarter of an inch, and the width of that recess is approximately one-half of an inch. However, if desired, any of all of those dimensions can be varied to correspond to the dimensions of hamburgers of different size.

It will be noted that no part of the dough which is applied to either of the molds 10 or 32 is deposited within a dihedral angle defined by walls; and hence neither of those molds will experience the sticking of the baked buns which is experienced by molds which have dihedral angles and which are used to "proof" and bake buns. Further, it will be noted that as the yeast-raised dough is applied to either of the molds 10 and 32, that dough is not bent over sharp edges, and it need not be stretched to fit exact dimensions. Instead, that dough is permitted to drape over flat or gently-rounded surfaces, and the edges of that dough are permitted to extend into smoothly rounded, concave recesses. Moreover, it should be noted that as the yeast-raised dough is "proofed" on the molds 10 and 32, it is not confined to fixed and arbitrary dimensions and, instead, can assume the dimensions which the "proofing" nature of the dough requires.

Whereas the drawing and accompanying description have shown and described two preferred embodiments of the present invention, it should be apparent to those skilled in the art that various changes may be made in the form of the invention without affecting the scope thereof.

What I claim is:

1. The process of making a centrally recessed bun from a layer of initially flat yeast-raised dough, comprising laying the dough layer on a support of heat-resistant material, a surface of which is displaced in an upward direction from the support and with a recess of semi-circular cross section which is displaced in the downward direction from the said support and which extends around, and extends laterally outwardly relative to the said surface, with an inclined wall which extends upwardly from the inner periphery of said recess to the periphery of said surface, permitting the layer of so-placed dough to airproof itself whereby, in the proofed state, the layer is thicker and the peripheral edge thereof largely fills and contacts the recess and assumes the semi-circular cross section of said recess, with the proofed layer of yeast-raised dough receiving on one side thereof full support from said surface, said recess, and said inclined wall, during and subsequent to the proofing thereof, and being in contact with said surfaces, and baking the so-supported and proofed dough, to form a bun which has a centrally located recess defined by an upwardly and outwardly inclined wall with a gently rounded upper edge, and with those external surfaces of the bun unrestrictedly exposed to the air during proofing and baking having a crust of lower porosity than that of the other surfaces, with the other surfaces thereof and the inner bun material having higher porosity, whereby said bun is adapted to absorb materials of substantial liquidity through and in said higher porosity portions, while substantially preventing passage thereof through the external surfaces of substantially lower porosity resulting from the air proofing and subsequent baking of the exposed areas of said layer.

2. The process of making a recessed bun adapted for the reception of an edible material including in part a semi-liquid material comprising the steps of:
   A. placing an initially flat layer of yeast-raised dough on a male supporting mold including a central raised portion having a flat upper surface, and outwardly and downwardly inclined sides terminating in a peripheral inverted groove;
   B. supporting said layer of dough with the underside thereof in supported contact with said central raised portion, and the peripheral edge thereof within and in supported contact with the inner surface of said groove, and with the remaining surfaces of said dough layer being non-supported or contacted with the mold and being openly exposed to a surrounding atmosphere of air,
   C. permitting said layer to proof itself, with those portions not in supporting contact with said mold being openly exposed to the surrounding air and thereby being air proofed;
   D. baking the so-proofed dough layer while maintaining the same relationships of portions contactedly supported and exposed, whereby the resulting bun will include an inner area of relatively high porosity consisting of the contacted areas and relatively low porosity over the exposed external areas, the different porosities serving to hold and distribute liquid materials placed in the inner part and deterring passage thereof through said outer part of lower porosity.

3. The process of making a centrally recessed bun comprising the steps of:

A. placing a layer of initially flat yeast-raised dough on a male mold having a generally planar support of heat-resistant material and a stiffened edge extending around the periphery thereof, a surface being displaced in the upward direction from that planar support and the support further having a continuous upward opening recess of semi-circular cross section which is displaced in a downward direction from the planar support and which extends adjacent, totally around and laterally outwardly relative to the said upward displaced surface, and said upward displaced surface including a continuous inclined wall which extends upwardly from the inner periphery of the recess and terminates in said upper surface which is an elongated flat surface disposed upwardly above the level of the planar support and at the upper periphery of said inclined wall, said inclined wall and said upper surface constituting a truncated trapezoidal configuration with rounded ends, B. so placing the layer of yeast-raised dough that a central portion thereof rests on said upward displaced surface, the peripheral edge portion thereof extending into said recess and terminating therein and at least an intermediate portion thereof being supported by said inclined wall, C. air proofing only the exposed portions and surfaces of the so-placed layer of yeast-raised dough on said mold, while maintaining an air proofing preventing contact of the remainder with the mold surfaces, D. baking the so-proofed dough layer while on said mold while maintaining the air proofed exposed portions out of contact with the mold, to form a bun which has a centrally located recess defined by an upwardly and outwardly inclined wall with a gently rounded upper edge, and with the inner surfaces and upper edge having relatively high porosity, and the exposure of said specific portions and surfaces to air during proofing and baking resulting in these portions and surfaces having relatively low porosity.

4. A bun produced by the process of claim 1.
5. A bun produced by the process of claim 2.
6. A bun produced by the process of claim 3.

UNITED STATES PATENT OFFICE
CERTIFICATE OF CORRECTION

PATENT NO. : 4,065,581

DATED : December 27, 1977

INVENTOR(S) : Theodore B. Heidepriem

It is certified that error appears in the above-identified patent and that said Letters Patent are hereby corrected as shown below:

On the cover sheet the inventor's name should read

--- Theodore B. Heidepriem --- .

Signed and Sealed this

Twenty-eighth Day of March 1978

[SEAL]

Attest:

RUTH C. MASON
Attesting Officer

LUTRELLE F. PARKER
Acting Commissioner of Patents and Trademarks